United States Patent [19]

Orcutt

[11] 4,269,351
[45] May 26, 1981

[54] PROPORTIONAL STROKE AUTOMATIC TEMPERATURE CONTROL SYSTEM

[75] Inventor: John W. Orcutt, Norton, Mass.

[73] Assignee: Texas Instruments Incorporated, Dallas, Tex.

[21] Appl. No.: 58,884

[22] Filed: Jul. 19, 1979

Related U.S. Application Data

[60] Division of Ser. No. 830,530, Sep. 6, 1977, Pat. No. 4,206,645, which is a division of Ser. No. 501,711, Aug. 29, 1974, Pat. No. 4,063,682, which is a continuation of Ser. No. 422,954, Dec. 7, 1973, abandoned.

[51] Int. Cl.³ .............................................. G05D 23/00
[52] U.S. Cl. ........................................ 236/87; 91/365
[58] Field of Search ...................... 236/87, 93 R, 80; 91/365

[56] References Cited

U.S. PATENT DOCUMENTS

| 2,789,543 | 4/1957 | Popowsky | 91/365 |
| 3,727,837 | 4/1973 | Gazzera et al. | 236/87 |
| 3,856,201 | 12/1974 | Genever-Watling et al. | 236/93 R |
| 3,877,638 | 4/1975 | Amano et al. | 236/91 R |

Primary Examiner—William E. Wayner
Attorney, Agent, or Firm—John A. Haug; James P. McAndrews; Melvin Sharp

[57] ABSTRACT

This invention relates to an automatic temperature control system for automobiles and improved components thereof. The control system operates on the proportional stroke principle and comprises an in-car air sensing tube biased with ambient air; a sensor in an aspirator at the end of the tube; a moving pivot operated directly by the output of the sensor; and a feedback valve operated by the moving pivot for driving a vacuum-assist motor, the output stroke of which operates the various electrical and vacuum functions of the heater-air conditioning system.

9 Claims, 23 Drawing Figures

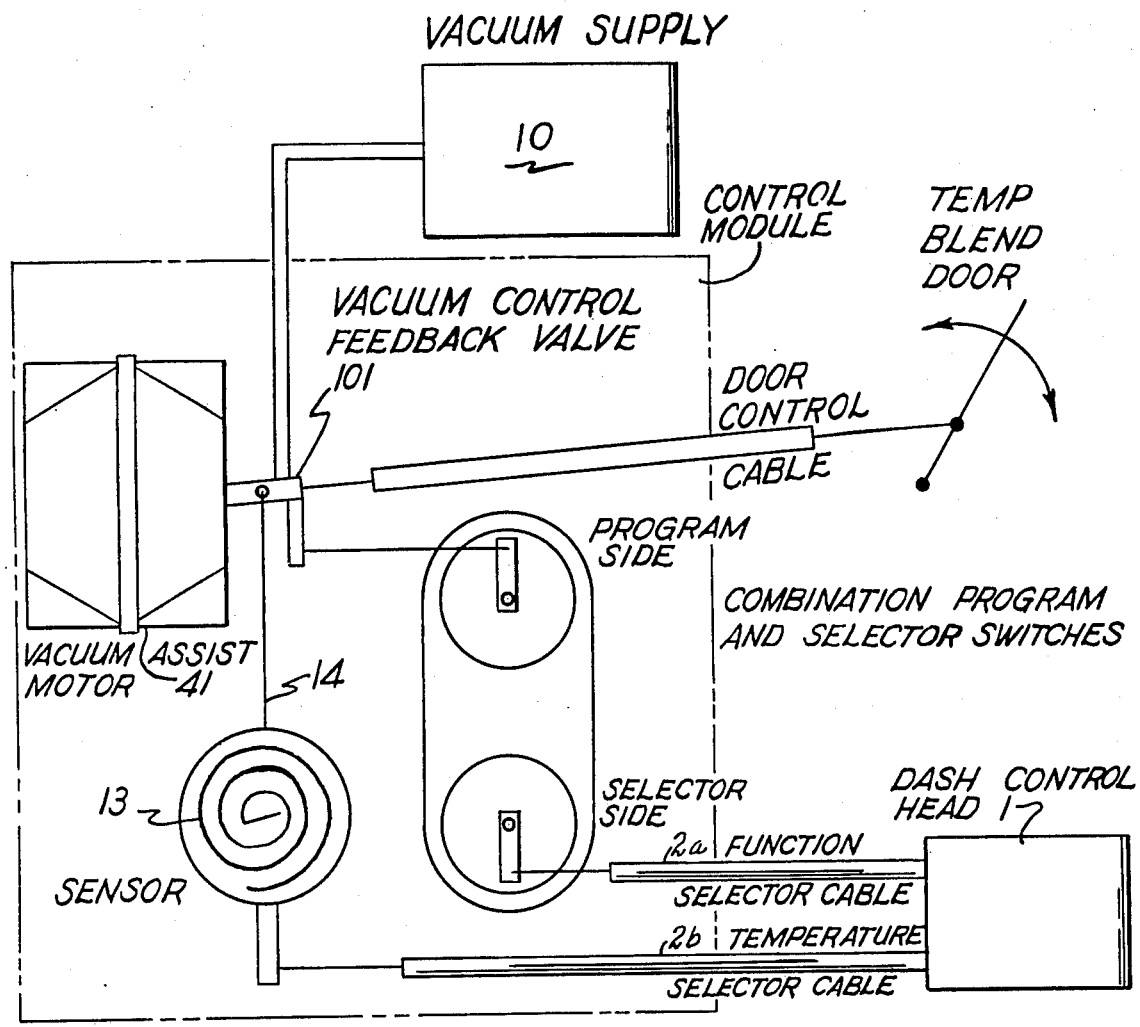
FIG. IA

PROPORTIONAL STROKE AUTOMATIC TEMPERATURE CONTROL SYSTEM

This is a division of application Ser. No. 830,530, filed Sept. 6, 1977, now U.S. Pat. No. 4,206,645, which issued June 10, 1980, which in turn is a division of application Ser. No. 501,711, filed Aug. 29, 1974, now U.S. Pat. No. 4,063,682, which issued Dec. 20, 1977, which in turn is a continuation of application Ser. No. 422,954, filed Dec. 7, 1973, now abandoned.

BACKGROUND OF THE INVENTION

A. Field of the Invention

This invention relates in general to an automatic temperature control system for automobiles, improved components thereof and the arrangement of such components within the system.

B. Description of the Prior Art

Automatic temperature control systems were first introduced in about 1964 in the United States and are now available on most large size cars. In the systems heretofore, the components of the system have been scattered throughout the car, being interconnected by vacuum and wiring harnesses. One of these systems, for instance, has a main component grouping on the power servo, with other hardware located on the dash control, in ducts, on the air conditioning case, and in the engine compartmemnt. Another has many components grouped on the heater-air conditioning case, with other components on the dash control, under the dash and in the engine compartment. These systems are generally complicated, difficult to install and maintain, expensive to produce and inaccurate.

The components of such systems and their function is as set forth below:

1. Sensors—to sample in-car and ambient temperature;
2. Transducers—to convert the sensors' output to a control signal;
3. A power servo—to convert the control signal to a stroke, thereby driving program switches and a temperature door. Bimetal sensors have been used to sense temperature changes and provide a signal responsive thereto for many years. However, the signal from such a sensor is very small and is rarely able by itself to provide the necessary force to activate a mechanical or electrical system of which the sensor is a part;
4. Program switches—to control system functions such as air discharge location, blower speed, recirculation, water valve, on-off function, etc.;
5. A temperature blend door—to modulate the air discharge temperature from the heater-air conditioning system;
6. Dash controls—contains levers used by the driver of a car to adjust and set the system to the desired mode and condition of operation;
7. Selector switches—operated by the dash controls;
8. Cold engine lockout (CELO) valve—to delay the system operation in its heater mode until the heater core is warm;
9. Compressor ambient switch—to control the compressor operation as a function of the ambient temperature;
10. A water valve—controlled by a program switch to turn water off to the heater core under maximum cooling conditions; and
11. A resistor block—contains a dropping resistor for fan speed control. This works in conjunction with the program switches.

There are many problems associated with these systems.

In operation, these systems generally have two sensors which individually sense the ambient and in-car temperature and convert these readings to either electronic or mechanical signals. The ambient signal is used to bias the in-car signal and the single output is used to control the operation of the system. The appropriate temperature is generally supplied by the operation of a temperature blend door whose opening and closing regulates the heat and air conditioning supplied from the heater and air conditioner.

Since the sensors are often mounted at the end of long tubes supplying the in-car and ambient air, error in the sensing apparatus is often introduced by the air passing through long super-heated stretches which bias the temperature of the incoming air. For instance, the in-car air is often sampled by letting air enter a tube which is underneath the dash. By the time the air reaches its sensor near the fire wall, the temperature of the air in the tube has often reached an elevated temperature to that of the original air by reason of bias occurring when the air passed through heated areas under the dash. This problem has sometimes been corrected by placing both sensors at the spot where sampling air was taken in, but this requires long electrical leads and electrical conversion signals for changing the temperature of the air sensed to an appropriate electrical value.

In these systems, the output stroke of the power servo is proportional to the vacuum level therein which in turn is proportional to the sensor signals from the two sampling devices. This is called a "proportional vacuum" system. A proportional vacuum system is subject to stroke hysteresis, i.e., there may be two different output strokes at the same vacuum level. As the transducer signal does not have a feedback loop, the sensors and transducers combination does not know where the servo motor stroke is at any given time, which causes drift, cycling and over-shoot.

Hysteresis is caused by the frictional forces required to drive the program switches, to open the temperature doors, by the override springs, and by various pin hole tolerances. Further, hysteresis is not constant from one system to another and will deteriorate with time.

In these prior art systems, as the vacuum level increases, the servo motor strokes toward maximum air conditioning mode operation while with decreasing vacuum the servo motor drives towards maximum heater condition. The friction in the system, however, causes the stroke to reach different positions for the same temperature, depending on whether the vacuum is increasing or decreasing. Current systems take two steps to alleviate these conditions and effect acceptable control. One is to provide high vacuum levels so that the slope of the control curve increases. This serves to decrease the differences in stroke for the same temperature. The second means used is to provide low friction program switches. These two means do serve to reduce hysteresis, but they present problems themselves in that the use of high vacuum level is hard to attain on the present-day automobiles with their numerous pollution control devices, especially on long hill climbs and the use of low friction switches is expensive.

There are two types of vacuum motors, or power servos, currently used to supply output to a shaft from a supply of vacuum. These are often used to operate car doors, as well as to drive switches in an automatic temperature control system. Generally, these motors consist of two case halves (the cylinder) which entrap a diaphragm upon which is mounted a rigid piston with an output shaft. One case half has a port connected to a source of vacuum and the other half is open. As vacuum is varied through the port, the motor strokes towards and away from the case half containing the port.

One type of such motor in use now is called a rolling diaphragm motor. Here as the piston strokes towards the case half containing the port when vacuum is increased, the diaphragm transfers from the piston area to the cylinder. This provides maximum effective area for the cylinder diameter and allows the motor to take large pressure differences. However, the piston must always support the diaphragm requiring very deep case halves and the pressure differential cannot be reversed.

A second type of such motor or servo in present use is the flip-flop diaphragm motor. Here the diaphragm does not transfer from the piston to the case and has no defined convolute. This motor has the advantage of having a shallower case than does the rolling diaphragm motor and the motor can take pressure reversal. However, it requires a larger diameter for the same effective area achieved in a rolling diaphragm motor and it cannot take as much pressure differential as the rolling diaphragm motor can.

Vacuum switches or valves are used in automotive applications in an on-off mode to apply vacuum to various places within the system to open and shut air supply doors, etc. In the automatic temperature control system of the present invention, vacuum switches are used for such things as determining the air discharge location, blower speed, recirculation operation mode, water valve operation, etc. Several types of such switches are presently on the market, all of which have certain disadvantages.

One type is generally made of two die case pieces which are lapped smooth. Ports are provided in one half while the other has channels so that when the second half is rotated it either provides a channel from one port to the other so that vacuum can be switched from one port to another, or it closes the ports. These switches have generally required a fairly high force to overcome friction and cross-venting of the ports has resulted in serious vacuum leakage and loss of vacuum, especially on long hill climbs. This loss of vacuum causes a loss of control in all of the vacuum systems.

Another such switch has the movable portion made of rubber, which is molded to a metal plate. Here the switch has very small ports, on the order of 0.020 inches, with relatively large rubber sealing contact areas. The small size of the ports often allows blockage due to frost or accumulation of dirt.

A type of valve used to produce proportional vacuum is what is known as a dog bone valve. This has three modes of operation as follows:

(1) At rest, the dog bone component seals off both the vacuum and vent ports so that there is no operation of the overall valve;

(2) A diaphragm in the dog bone valve allows a vent body which surrounds the dog bone components to move in response to outside forces. When the valve is to supply additional vacuum, the valve body pulls upon the dog bone component and releases it from its seat, thereby allowing the vacuum level of the valve to increase to the supply level unless the dog bone component is first returned to its rest position; and (3) When vacuum is to be decreased, the vent body is moved further into the valve until it is released from contact with the dog bone component, thus allowing venting of the vacuum within the valve. This venting continues until the vent body returns to its rest position in contact with the dog bone component.

SUMMARY OF THE INVENTION

This invention is for an improved automatic temperature control system for automobiles whereby the operator may set a desired in-car temperature and the control system will operate the heater and air conditioning systems to keep the in-car temperature at the selected mark.

It provides an accurate means of maintaining the selected temperature by eliminating frictional losses and providing for low hystereis, in reducing the amount of vacuum required from the engine, and by negating the inaccuracies of return springs. It eliminates certain electrical relays and override springs, thereby cutting complexity and cost. It groups the components in a single module at the fire wall so that under-dash congestion is reduced and a compact, easily producible, relatively inexpensive, module type system is attained. The module concept allows system calibration at the factory and easier servicing once the car is in use since all important elements are under the hood in one place. Further, this system allows low vacuum operating levels and option possibilities such as variable blower speed; high blower coming on when engine is started under hot soak start-up conditions; diagnostic functions for vacuum, electrical and automatic operations; and low blower come-on under cold soak start-up condition.

The ambient and in-car air is fed through a delivery tube wherein the in-car air is biased by the ambient air so that only a single temperature sensor is required. The sensor directly drives a vacuum-vent valve mounted on the output member of a vacuum-assist motor, thereby monitoring the relative position of the sensor and the vacuum assist output and physically moving with the stroke of the motor to form a feedback loop. This valve applies vacuum or vent to the assist motor to drive the stroke to its proper position and thereby maintain the desired temperature in the car. The stroke of the vacuum-assist motor operates various switches causing the operation of the system components, such as the temperature blend door, the CELO valve, the water valve, etc. Thus this is a proportional stroke system, as opposed to the prior art proportional vacuum systems.

The sensor is attached to the long end of an input link which is normally in a horizontal position. When the sensor moves because of a change in in-car or ambient temperature, the vacuum-vent valve is activated by reason of the mechanical advantage in the linkage. This activation causes the valve to change the vacuum level in the vacuum-assist motor, causing it to stroke to such a position, against spring force, that the linkage is again brought to its horizontal rest position, whereupon the system again comes to rest.

The entire system comprises only three cables, twelve electrical contacts, ten vacuum connections (serving eight functions) a cold engine lockout switch, the double walled tube, and the control module. Using this module system where all the components are grouped in one place greatly increases the reliability of the total system, e.g., less parts are required, the hysteresis losses are minimized, there are fewer external electrical and vacuum connections, etc.

Also shown and described herein are improved components of the system. One vacuum-vent valve used to control the vacuum-assist motor in the feedback loop is of a novel "H" valve type wherein twin diaphragms are provided in the valve to negate the effect of a single diaphragm on the valve's operation. A balance chamber is provided so that both diaphragms see the same vacuum level.

Another vacuum vent valve shown and described is of a flapper valve type. Here too the input link is directly connected to the bimetal sensor, which causes the valve to vary the vacuum input to the vacuum-assist motor and thus vary the output stroke of this motor.

A new rotary vacuum valve or switch is described wherein twin contact lines on the movable part of the valve eliminates cross venting from port to port and wherein the wiper blades can take more out-of-flatness without leaking.

A new vacuum-assist motor, generally of the rolling diaphragm type, is shown wherein the cylinder wall is sloped to increase the stroke, with the same case depth, and allow for a shallower overall motor to be used.

BRIEF DESCRIPTION OF THE DRAWINGS

FIG. 1A is a schematic view of the control module, the vacuum supply, the temperature blend door, the dash control head and the interconnecting cables of this invention.

DESCRIPTION OF PREFERRED EMBODIMENTS

Figure 1:
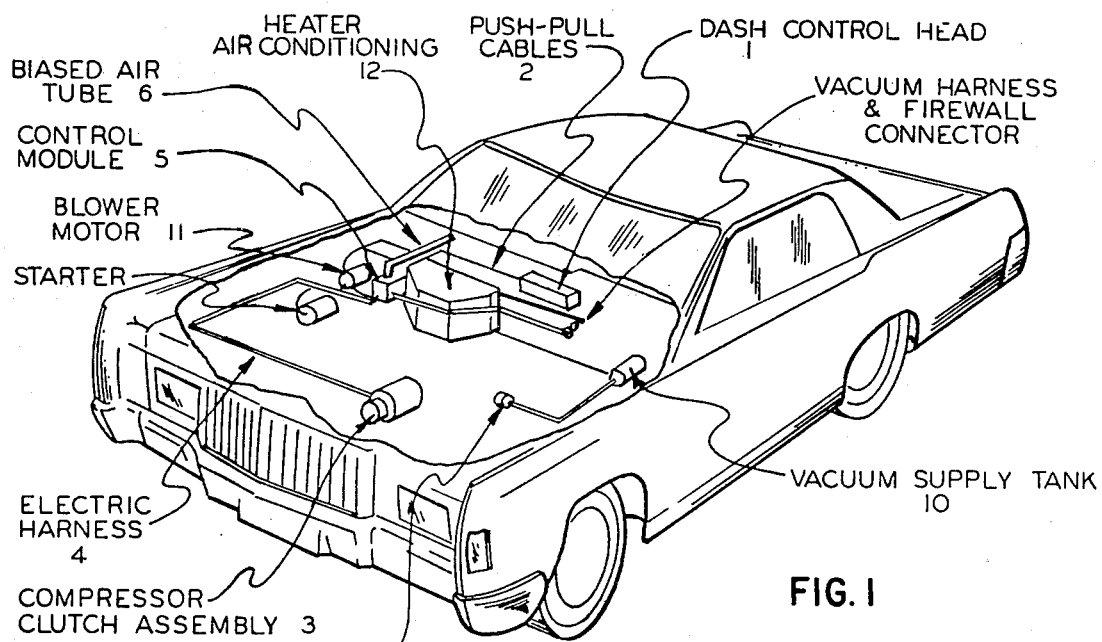
FIG. 1 is a partially cut away, prospective view of an automobile showing the installation of the automatic temperature control system of this invention.

FIGS. 1 and 1A show the general arrangement of the components in the automatic temperature control system of the present invention. The driver of the automobile selects the mode and the temperature he desires by moving the controls on the dash control head 1. For instance, he might select automatic mode with a temperature of 75° F. This input is introduced into the system through two push-pull or tension cable 2, one selecting the mode and one the temperature at which the system will operate. These are conveniently Bowden cables, although other types could be used as well. The selection at the dash control head 1 commences the operation of the automatic temperature control system.

The blower motor for the fan is shown generally at 11 in FIG. 1. The compressor clutch assembly is connected to the control module 5 through electric harness 4.

Figure 2:
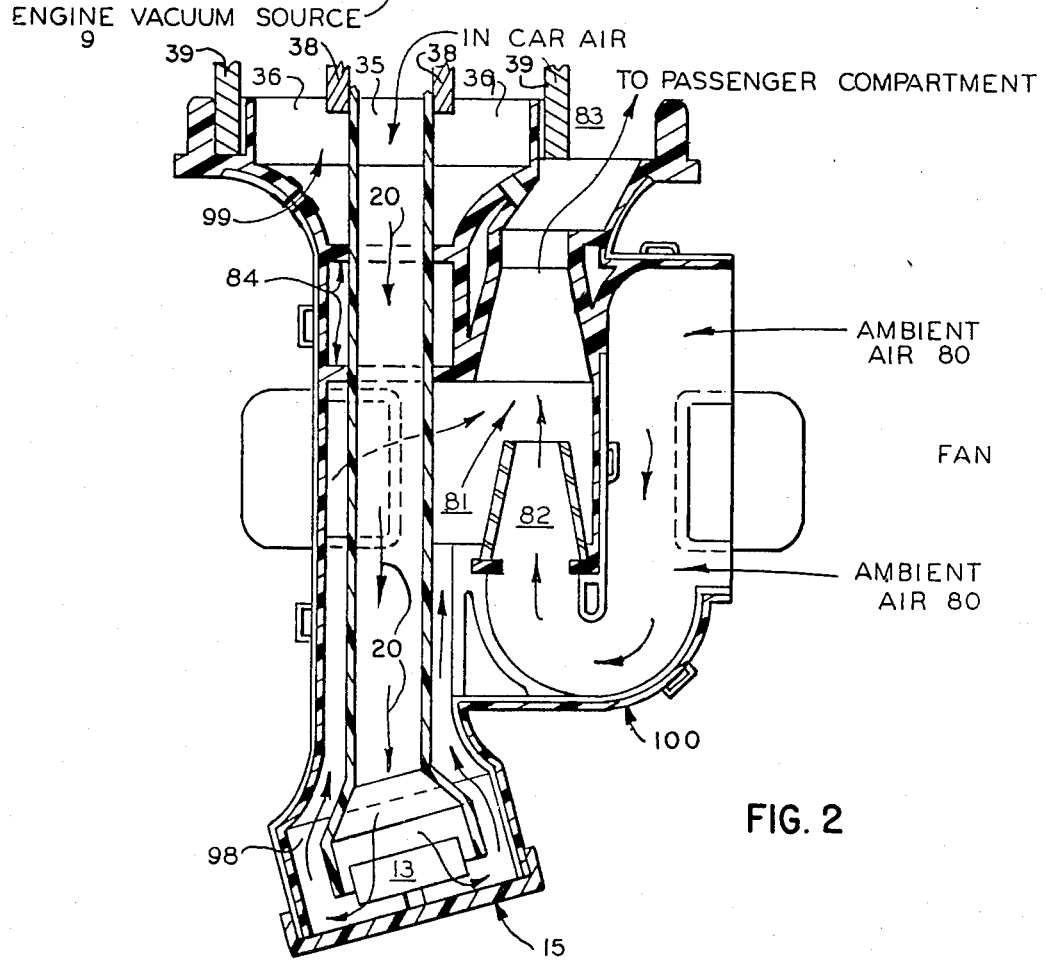
FIG. 2 is a cross-sectional view of the sensor housing and aspirator of the present invention.
Figure 19:
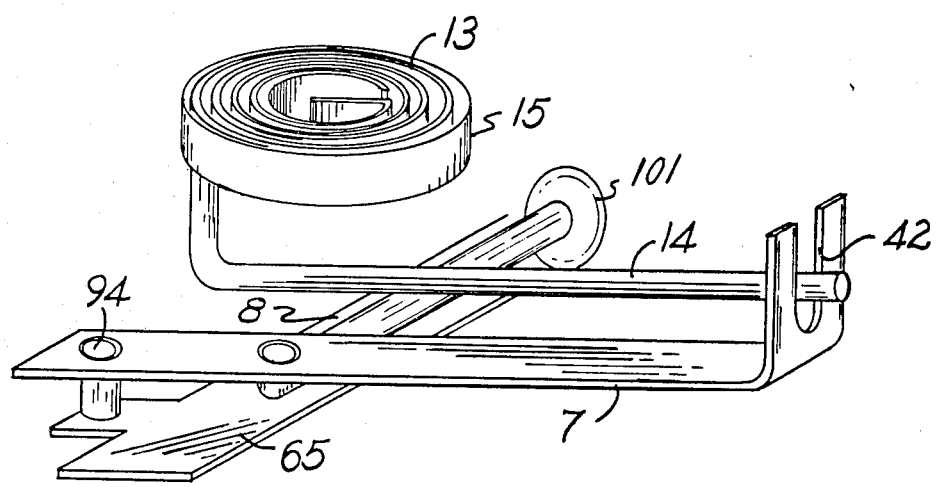
FIG. 19 is an enlarged view of the linkage portion of the feedback system of this invention consisting of a bimetal coil, a sensor arm, an input link, a closure member, a movable pivot point and an output member with pivot extension.

The control module 5, as best shown in FIG. 1A, groups most elements at one place on the heater-air conditioning case 12, between the fan and the evaporator case (not shown), rather than being spread throughout the automobile as has been previously done. The items in this compact module are: a bimetal sensor 13 as shown in FIGS. 1A, 2 and 19; the vacuum-assist motor 41 with feedback valve such as best shown in FIGS. 1A, 3-5 and 7; program switches and valves, such as shown in FIGS. 1A, 7, 8 and 15; selector switches and valves operated by controls on the dash control head; the compressor ambient switch; and the resistor block for the fan. The control module 5 is connected to the dash control head by means of two push-pull cables 2, one for temperature selection 2b and the other for mode selection 2a. A third cable connects the vacuum-assist motor 41 to the temperature blend door, as shown in 1A. The control module 5 occupies a space approximating a cube of 6 inches on a side.

Figure 3:
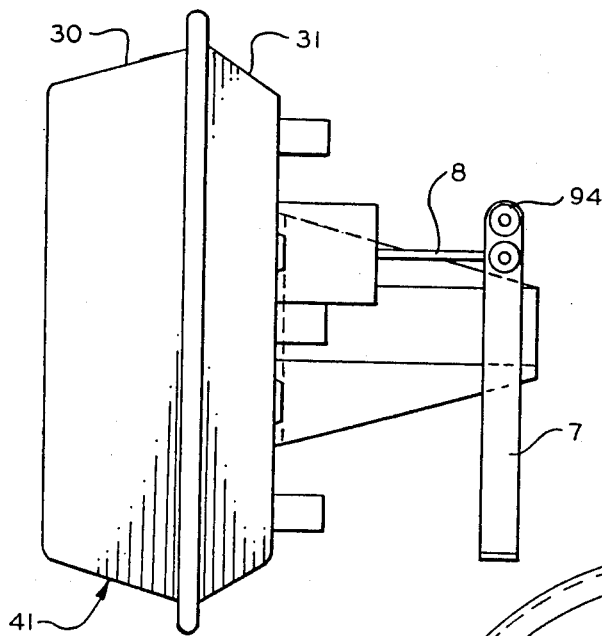
FIG. 3 is a plan view of a new rolling diaphragm vacuum-assist motor, flapper vacuum-vent valve and moving pivot of the present invention.
Figure 12:
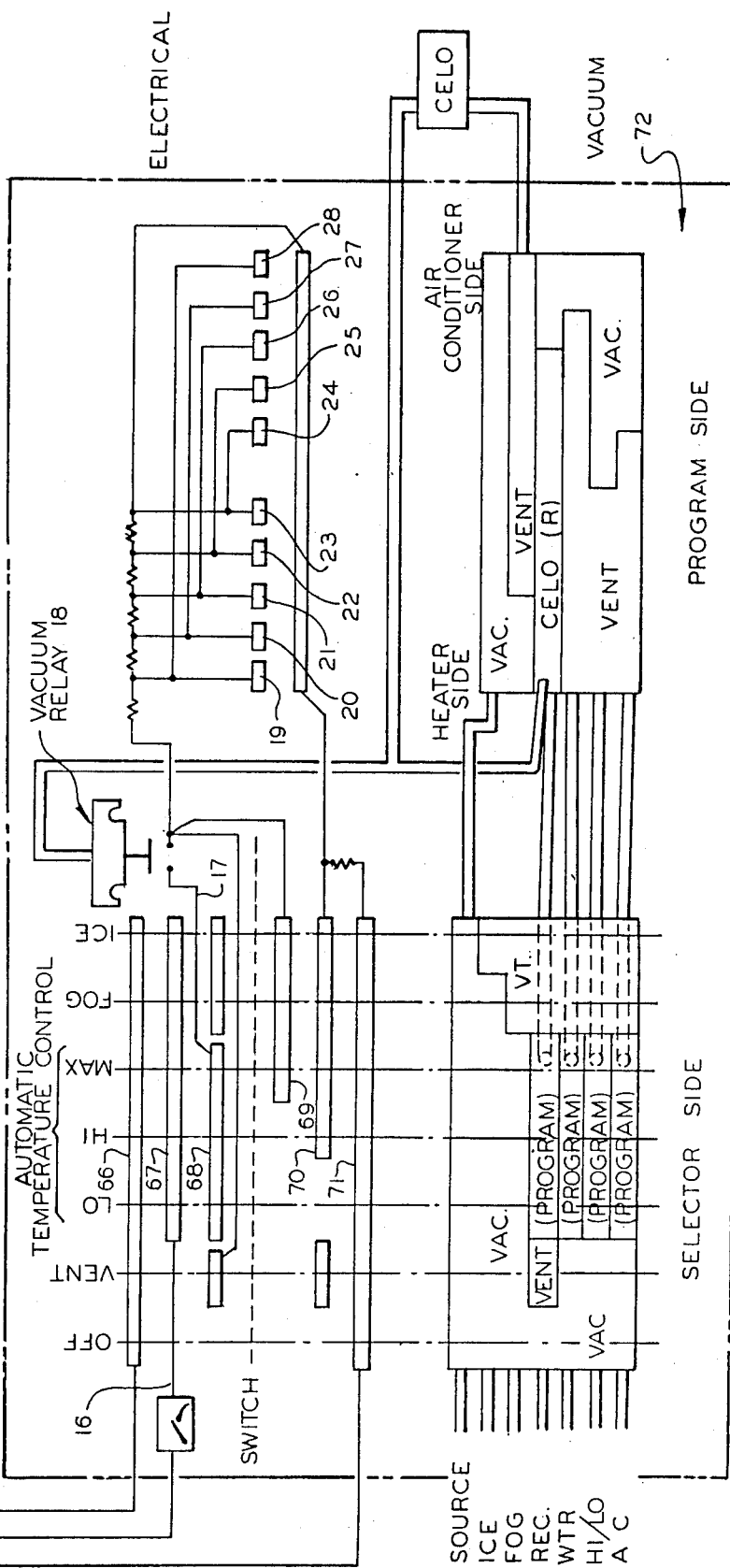
FIG. 12 is the electrical and vacuum diagram for the automatic temperature control system of this invention.

Vacuum is supplied to a vacuum-assist motor 41, as shown in FIG. 3, located in the control module 5 from the engine vacuum source 9 through the vacuum supply tank 10. The position of the output stroke of motor 41 causes vacuum to be supplied through various valves or switches to activate the various stations of the system, such as the CELO valve, etc. The position of its stroke also activates the program electrical switches of the system. The complete vacuum and electrical schematic is shown in FIG. 12 and the operation of the stations corresponding to the length of the stroke is portrayed in FIG. 13 to be discussed in detail later.

By the use of this control module 5 a vastly improved automatic control system is provided since the wiring harness almost disappears and there are no electrical connections at the firewall or leads inside the car. The control module system moves everything under the hood and significantly frees the under-dash area. The electrical harness here is reduced over 90 percent from prior art manual systems.

Figure 13:
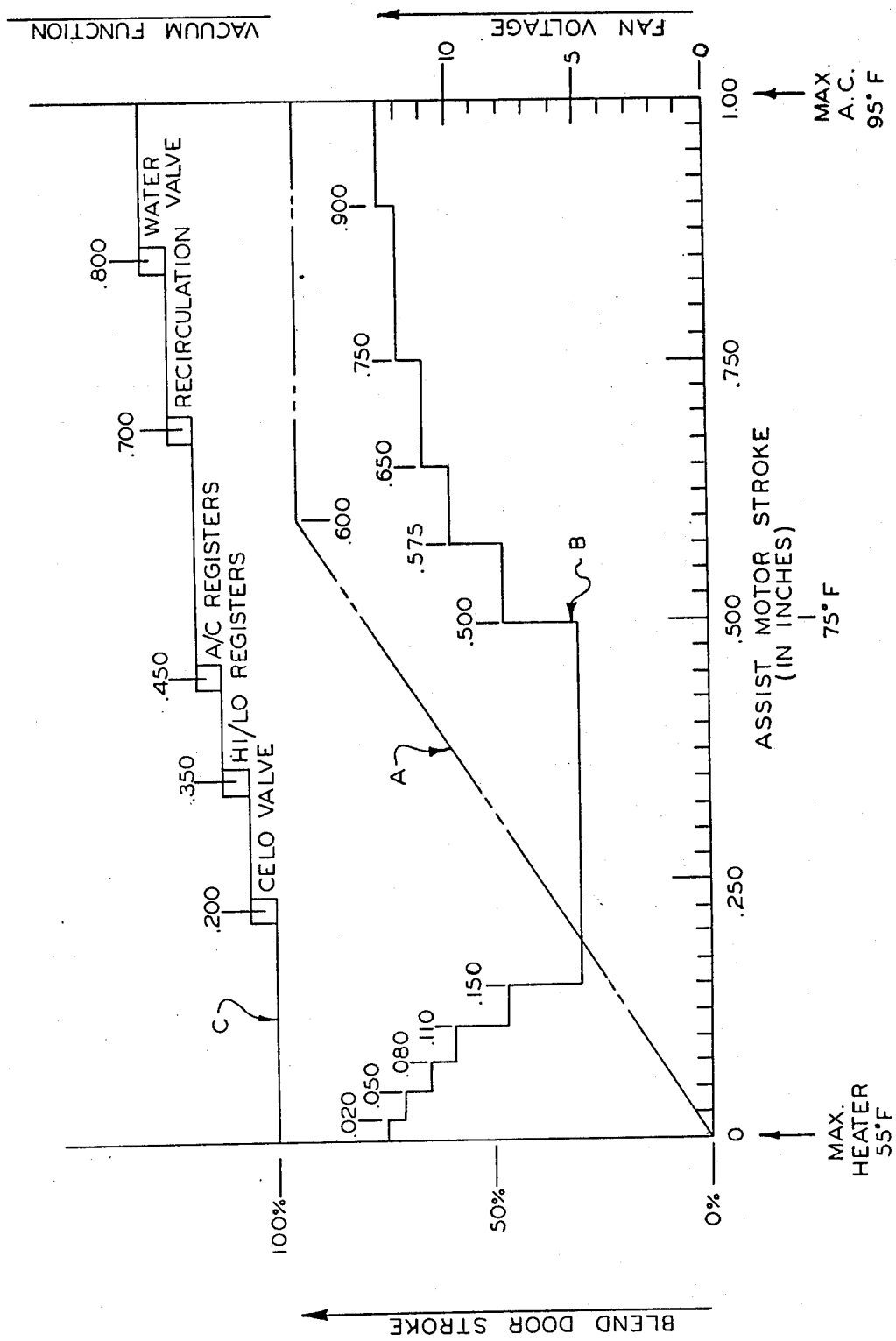
FIG. 13 is a graph showing the stroke of the vacuum-assist motor vs. the movement of the blend door, the fan voltage and the activation points of various components in the present invention.

Generally, in existing automatic temperature control systems, the range between the full heater and full air conditioning operation is 40° F., with the mid-point being 75° F. and that arrangement has been used here. As more fully discussed later, as the in-car temperature deviates from the 75° F. point, the control stroke of vacuum motor 41, as shown in FIG. 19, will respond according to the bimetal sensor 13. The total stroke of the vacuum-assist motor 41, as caused by the bimetal sensor, is 1 inch. Therefore, the ½-inch mark is the mid-point or 75° F. A half inch deviation from this mid-point in either direction will drive the system either to full heater or full air conditioning operation. At a 55° F. in-car temperature, for example, the control stroke would have moved one-half inch as shown in FIG. 13 to full heater operation. Ambient sensitivity is only one-fifth that of in-car, and would require a 200° F. change to drive the vacuum motor full stroke. Therefore, a 100° F. ambient change from the 75° F. mid-point is required to force the control stroke to either maximum heater or maximum air conditioning due solely to changes in ambient temperature.

With my new vacuum-assist motor the entire system works off of a 5-inch vacuum supply.

There are two distinct sides or general functions involved in my system: the selector side and the program side, as shown in FIGS. 1A and 12. FIG. 13 illustrates the operation of the programmer side of the system in graphic form as the assist motor 41 strokes to control the blend temperature door opening and operate the various stations in the system. FIG. 12 shows the electrical and vacuum operation of the automatic temperature control system of this invention. It should be noted here that this system only operates on the air side of the temperature control system and does not control the chemical or Freon side. The program side contains electrical contacts and vacuum ports which are activated according to the position of the stroke of the vacuum-assist motor 41. The selector side also contains electrical contacts and vacuum ports, but these are activated manually according to the mode of operation selected by the operator of the vehicle at the control head 1. The selector side can cause the program side to be overridden, e.g., in the off, vent, fog and ice modes. Altogether my system has 12 electrical switches, 6 on the selector side and 6 on the program side. It also has 8 vacuum functions requiring the use of 10 ports. The 6 electrical switches on the program side vary the voltage of the blower, as shown by line B in FIG. 13. The 6 electrical switches on the selector side activate the electrical input to the system, compressor ambient switch, and 4 functions relating to the blower: the CELO valve, the blower motor itself, and the high range and maximum range selectors. The 10 vacuum ports control: the source of vacuum; recirculation (2 ports); CELO valve (2 ports); High/Low Registers; Air Conditioning Registers; Water Valve; Fog Mode; and Ice Mode.

In FIG. 13, line A indicates the relationship of the temperature blend door stroke to the assist-motor 41 stroke, line B indicates the voltage applied to the variable speed fan vs. the assist-motor 41 stroke, and line C indicates where the operations there indicated are cut into or out of the system according to the assist motor stroke. As one example, at an assist-motor stroke of 0.5 inches, corresponding to an in-car temperature of 75° F. and at the motor's mid-stroke point, a fan voltage of 8 volts is shown, which is approximately 60 percent of the fan's full capacity which occurs at an assist-motor stroke of 0.9 inches. Meanwhile, the temperature blend door is at approximately 75 percent of its total opening and the CELO valve, High-Low Registers and Air Conditioning Registers have all been activated, while the Recirculation and Water Valves have not. The blend door is directly attached to the output arm of vacuum-assist motor 41 by means of a push-pull cable.

With particular reference to FIG. 12, the driver of the automobile will select one of the positions (modes) on the dash control head 1, such as hi-automatic temperature control. He would also select the temperature at which he wishes the car to be kept at the control head. This selection, on the selector side, will cause the operation of the relay shown generally by the line 15 through the battery indicated, by reason of contact 66 being closed. It likewise will engage the compressor clutch assembly through line 16, by closing contact 67. The vacuum relay 18 closed by the CELO valve, feeds line 17 by reason of contact 68 being closed. The blower motor is activated by line 29 through the closing of contact 71 and high speed operation is caused by closing contact 70. Contact 69 is thus the only open contact in the Hi-mode operation.

In vacuum operation, on the selector side, the Source, Ice and Fog ports would be supplied with vacuum, while operation of the Recirculation Valve, Water Valve, High-Low Registers, and Air Conditioning Registers would be controlled by the program side.

Figure 8:
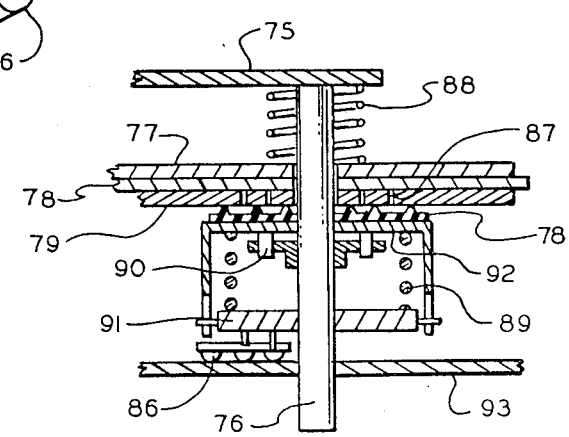
FIG. 8 is a cross-sectional view of the program side of the present invention.

On the program side, the electrical contacts 19-28 would determine the speed at which the blower motor operates and the operation of the various vacuum functions are controlled as shown schematically at 72 in FIG. 12. Each of these electrical and vacuum operations are determined by the position of the output arm of the vacuum-assist motor 41, as shown in FIG. 13 and FIG. 8 which will be described later.

As the operator sets the system for automatic temperature control, a push-pull cable, as shown in FIG. 1A, rotates the input shaft of the selector side of the system. The rotation of this shaft (not shown) would activate certain vacuum ports and electrical contacts as described above in connection with FIG. 12. At the same time, he would set the temperature lever at the control head 1 to the in-car temperature he desired. This lever, also through a push-pull cable, would rotate the cup 15, shown in FIG. 2, in which the bimetal sensor 13 reposes. The inner end of the bimetal coil sensor 13 is affixed to the cup so that rotation of cup 15 would cause the output arm 14 operatively connected to the outer end of coil sensor 13 to move to the desired setting. The setting now acts as reference point for future corrections by the temperature control system. As the biased in-car air passes over the sensor 13, as described below, its output arm will move dependent upon the temperature of the biased air.

Figure 14:
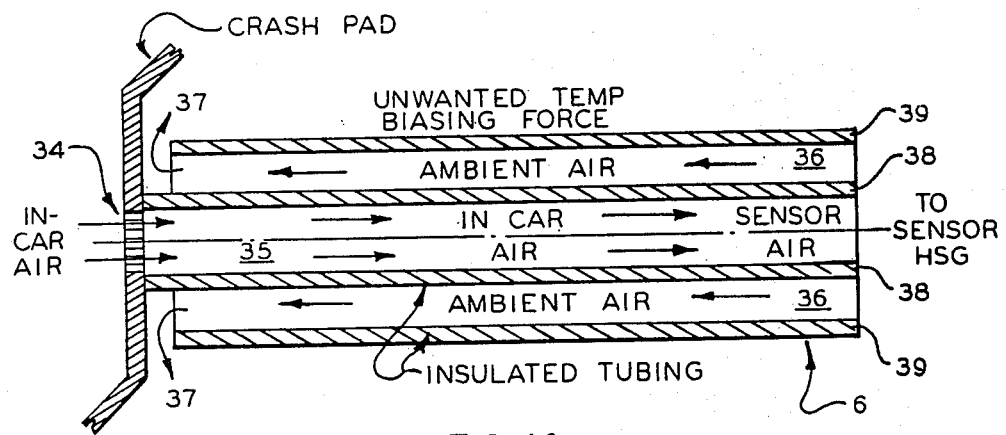
FIG. 14 is a cross-sectional view of the double-walled, biased tube of the present invention.

The in-car and ambient temperatures are sensed by air flowing through tube 6, a double-walled, biased tube with the first part shown in detail in FIG. 14 and the end portion shown in FIG. 2 which contains the sensor 13. It will be noted that double-walled tube in FIG. 2 is an extention of the double-walled tube in FIG. 14. This tube indicated generally by the numeral 6, is mounted behind the crash pad area of the automobile underneath the dashboard. In-car air is drawn though the grating 34 (FIG. 14) where it passes through the generally circular shaped area shown as 35 to the bimetal sensor 13 which is mounted in an aspirator housing 100 as shown in FIG. 2. At the same time, ambient air is taken into the aspirator housing, as shown in FIG. 2, whereby it passes to the outer annular walls of the double wall 6 as shown generally at 36. The ambient air exits near the crash pad, as indicated by arrows 37 in FIG. 14. Thus the ambient air passing through the space 36 will cause the in-car air passing through space 35 to become biased by heat transfer through walls 38. In addition to this biasing effect, the ambient air flowing through the space 36 provides a moving insulating barrier which will essentially reduce any unwanted temperature bias arising from the external heated air under the dashboard.

The inner walls 38 of the tube may be of any appropriate material which would allow the temperature transfer required, and I have found polyurethane foam to be an acceptable material. The outer walls 39 may be constructed of a paper tubing with a wire wrap. In a device built in accordance with this invention, the inner tube walls 28 are of approximately $\frac{5}{8}$ inches in inside diameter, and are approximately $\frac{1}{4}$ inches thick. The outer walls 39 have approximately $1\frac{5}{8}$ inches inside diameter and have a nominal wall thickness.

In the prior art two sensor, automatic control systems, the in-car air temperature sensor is five times as sensitive as the ambient air sensor and since this ratio has proven acceptable, it has been maintained in our system. Thus, in the biased, double-walled tube 6, the ambient air passing through space 36 should bias the air passing through space 35 by a factor of about one to five. The materials, dimensions, and aspirator shown and described provide this relationship.

Double-walled tube 6 feeds the biased air to sensor 13 through aspirator 100 as indicated by arrows 20 in FIG. 2. The biased air in space 35 is passed by the sensor 13, whereupon it exits through the annular area indicated at 98, through low pressure area 81 caused by nozzle 82, to the passenger compartment at exit 83. Seal 84 insures that this air does not again enter the double walled-tube 6. Ambient air enters the aspirator at 80 to pass through nozzle 82 to form the low pressure area at 81. Ambient air also enters the aspirator at 99 whereupon it passes through the outer space 36 in double-walled tube 6 to bias the in-car air for sensing.

The aspirator 100 is placed near the blower and ambient air enters from the windshield area. The aspirator 100 may be made of molded plastic with a wall of approximately 0.060 inch thickness and is glued, ultrasonically welded or stapled together.

Figure 5:
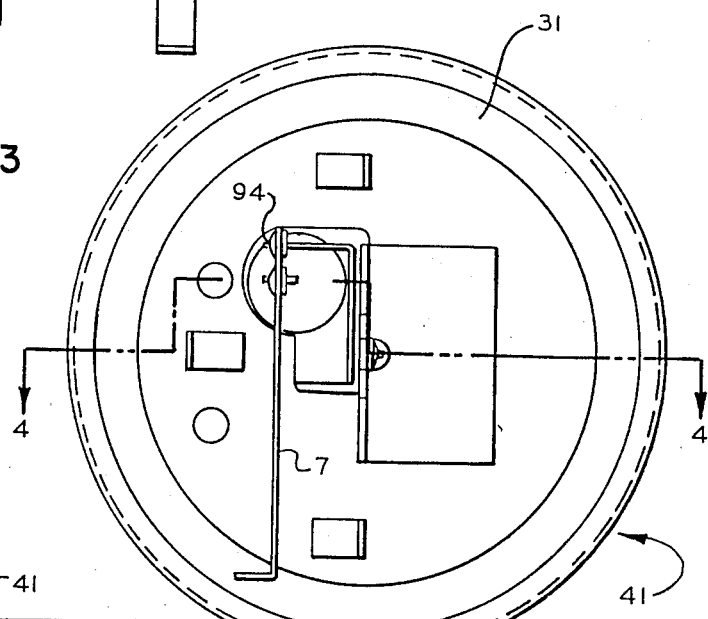
FIG. 5 is a bottom view of the rolling diaphragm vacuum-assist motor flapper vacuum-vent valve and moving pivot shown in FIG. 3.
Figure 4:
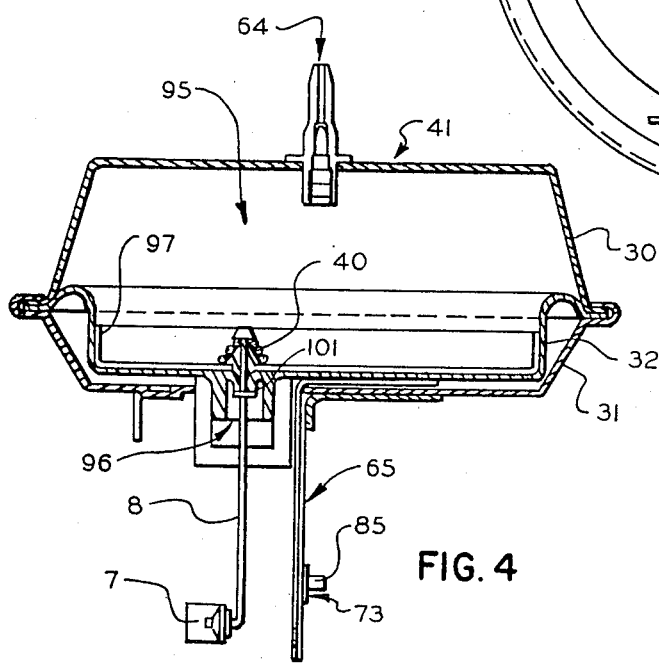
FIG. 4 is a cross-sectional view taken along line 4—4 of FIG. 5.
Figure 4A:
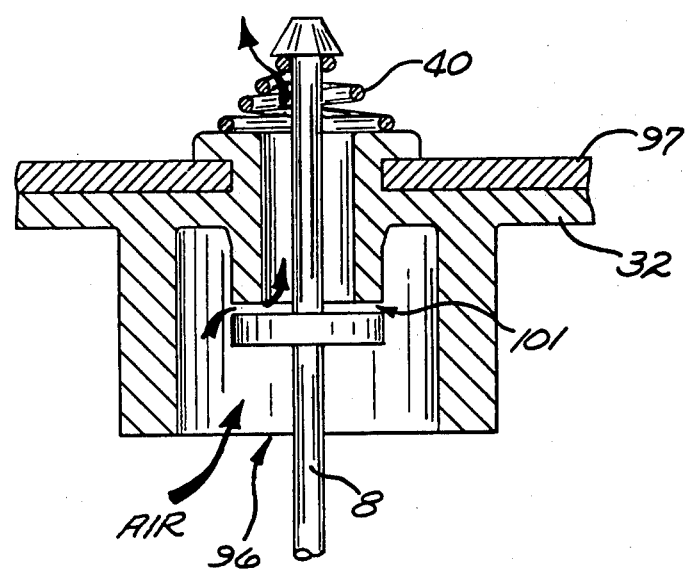

One embodiment of this invention, as shown in FIGS. 3–5, a feedback valve of the flapper type 101 is used. An input link 7, best seen in FIG. 19, is positioned by the relative movement of the bimetal sensor 13 through a sensor arm 14 which provides a force on the order of one-half gram per degree. The input link pivots about a movable pivot 94. The sensor arm 14 rests in a slot at point 42 on the input link 7. In a device built in accordance with this embodiment, the slot is approximately 0.06 inches in diameter and 2 inches in length. Input link 7 may be made of flat stock plain carbon steel and pivots around pivot point 94 which causes closure member 8 to move sweeping a small arc. As closure member 8 moves down against the force of the biasing spring 40 as viewed in FIG. 4, it will allow atmospheric air to pass into chamber 95 of a vacuum-assist motor 41 to be described in detail below, through the area around the valve seat 96. This will cause the diaphragm 32 which is attached to output member 65 of vacuum-assist motor 41 to move downward causing concomitant movement of pivot 94 until equilibrium is reached, thus providing a feedback function so that the position of member 65 of the vacuum-assist motor 41 will be directly proportioned to the position of the sensor 13 output.

As long as the input link 7 is horizontal as viewed in FIG. 4, no input of any kind will be supplied to closure member 8. However, movement of the input link either toward or away from the plane of the drawing FIG. 19 causes closure member 8 to move correspondingly but in a smaller arc which applies vacuum or vent to the vacuum motor 41. The application of the vacuum or vent causes the output member 65 of the motor to stroke thus changing the operating conditions of the automatic temperature control system. The vacuum-assist motor 41 will stroke until output member 65 reaches its furthermost position or until it causes input link 7 to again be in a horizontal position.

The vacuum-assist motor 41, as shown in FIGS. 3–6, comprises a first case half 30 and a lower case half 31 which encase and entrap a diaphragm 32, upon which is mounted a piston 97. It should be noted that these case halves have generally sloping walls as shown in FIGS. 3 and 4. This slope allows the diaphragm to transfer to the case wall or piston at a faster rate than in a conventional rolling diaphragm motor, thus requiring less diaphragm height. Since the height of the stroke of the diaphragm determines the height of the case, the case can be shallower than in previous devices. This gives an advantage over a typical rolling diaphragm motor in that there is a greater stroke with the same motor depth and only a very slight increase in the case diameter. A motor 41 made in accordance with the invention has approximately an outside diameter of 4 inches and case depth of $1\frac{1}{2}$ inches. It is constructed of plain carbon steel of about 0.025 inch thickness, while the diaphragm is made of 0.030 inches thick rubber.

As vacuum is increased through port 64, diaphragm 32 moves upward towards first case half 30, thereby moving the output member 65, and thus stroking through the various stations shown in FIG. 13. A spring, either internal or external, (not shown) attempts to return the diaphragm 32 towards its position near lower case half 31.

Since the vacuum-assist motor 41 works directly from the sensor through the feedback valve in this proportional stroke system without intervening mechanical linkages as present in a conventional proportional vacuum system, almost all hysteresis loss is eliminated. Further, since the feedback valve and vacuum-assist motor stroke member in this system are insensitive to forces present in the program switches, low cost, high force program switches may be used to reduce expense. Also, return spring characteristics are not critical since they only supply the return force, and do not determine the position of the output stroke member when it reaches equilibrium. The stroke position is determined by the bimetal sensor-feedback valve combination which is directly proportional to the position of the bimetal sensor 13.

Figure 6:
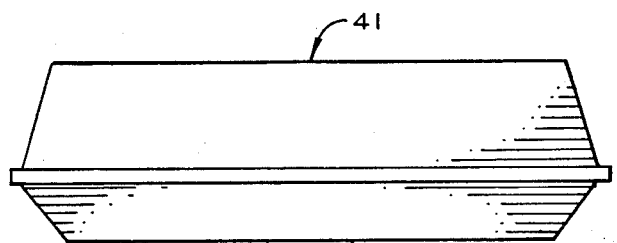
FIG. 6 is a partially schematic view showing the connection of the output of the vacuum-assist motor to the program switches.
Figure 15:
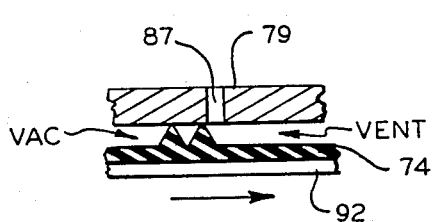
FIG. 15 is a detailed cross-sectional view of a portion of the rotary vacuum switch or valve of the present invention, shown in FIG. 8.
Figure 10:
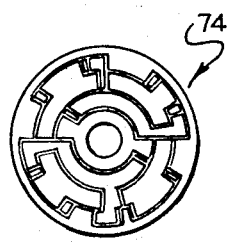
FIG. 10 is a top view of the gasket of the rotary vacuum valve or switch of the present invention.
Figure 11:
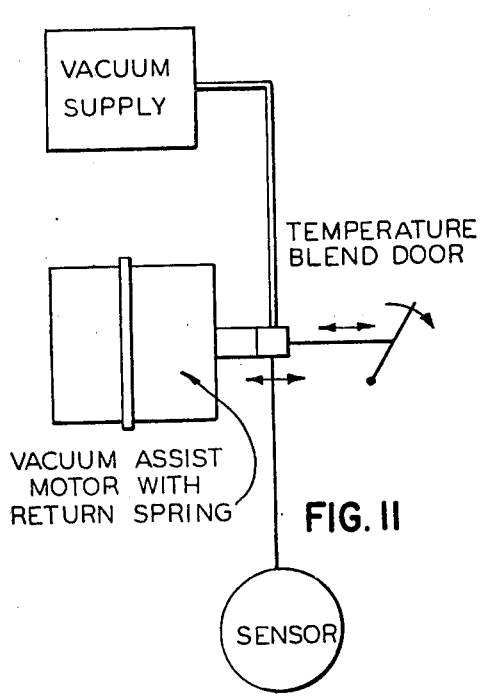
FIG. 11 is a schematic of the components of the automatic temperature control system of this invention.
Figure 9:
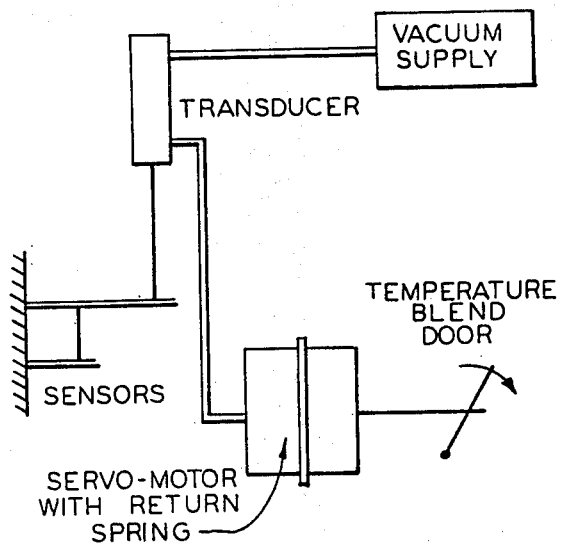
FIG. 9 is a schematic showing a prior art proportional vacuum automatic temperature control system.

Movement of the output arm of vacuum-assist motor 41, shown in FIGS. 6 and 8, is transferred to program signals as will be described below. Peg 85 is fixed to output arm 65 and is disposed in slot 75 formed in arm 75' to form a bell crank 73. Thus as output arm 65 strokes up and down with peg 85 sliding in slot 75, as seen in FIG. 6, arm 75' which is rigidly attached to shaft 76 pivots causing shaft 76 to rotate. Fixedly attached to shaft 76 of the program side of the invention, shown in FIG. 8, is a switch bushing 90, which in turn is rigidly attached to vacuum disc backup plate 92, upon which is fixedly attached vacuum program disc 74, as shown in detail in FIG. 10. Thus, vacuum program disc 74 rotates with the movement of shaft 76, which causes multiple sets of twin protrudences which are part of the disc to open and close the ports 87 in vacuum distribution plate 79. FIG. 15 shows in cross-section one set of these twin protrudences 74a and 74b from disc 74 and the corresponding port 87 which the protrudences control. The shape of the protrudences shown in FIG. 15 in cross-section are triangular, but the use of other shaped protrudences is perfectly acceptable. The use of the twin protrudences allows ports to be as large as required, typically 0.040 to 0.060 inches, because the dual contact points of the protrudences do not allow cross venting to take place.

Main contact carrier 91 is rigidly attached to shaft 76 causing electrical contacts and carrier 86 to make and break the contact switches 19-28 shown in FIG. 12. Ports 87 are appropriately connected through gasket 78 and top plate 77 to the appropriate valve to be operated. The electrical contacts and carrier 86 operate circuits through electric circuit plate 93. Springs 88 and 89 insure the proper tension for the necessary surface contact and sealing. The diameter of the program side, as shown in FIG. 8, is approximately 1½ inches.

Figure 7:
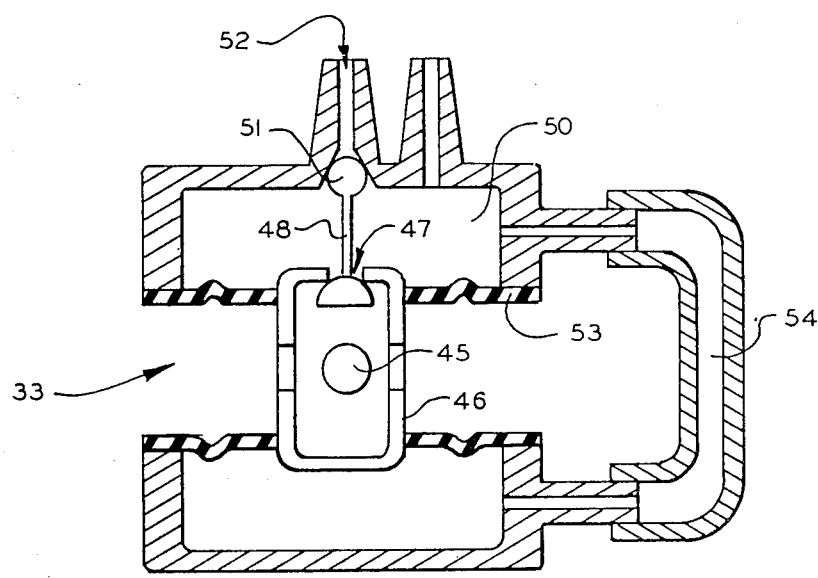
FIG. 7 is a cross-sectional view of embodiment H vacuum-vent valve.
Figure 20:
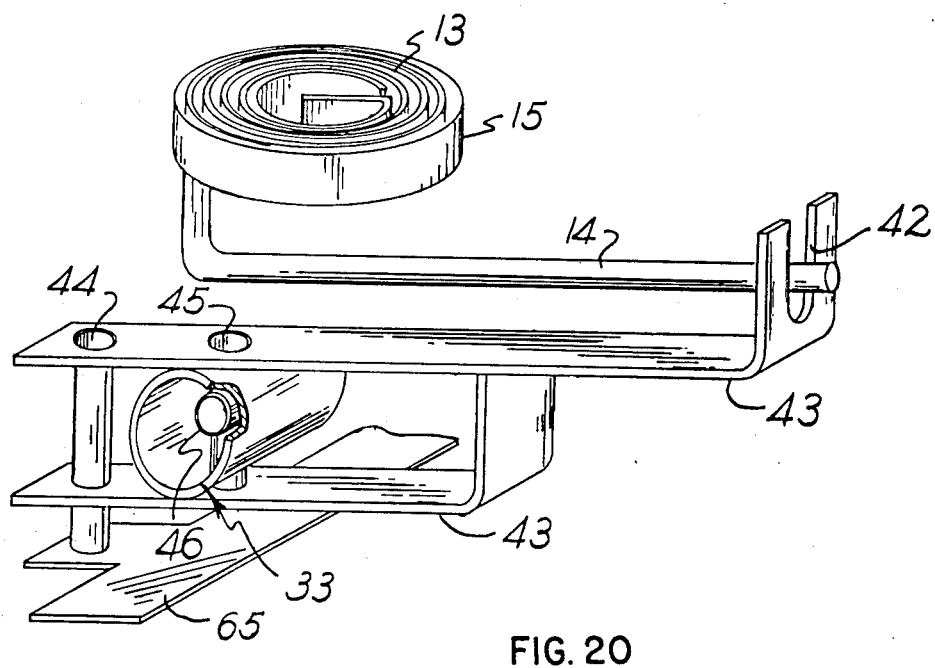
FIG. 20 is an enlarged view of an alternate emobidment of the linkage portion of the feedback system of this invention consisting of a bimetal coil, a sensor arm, valve input link, an H valve, a movable pivot point and an output member with pivot extension.

FIGS. 7, 16-18 and 20 show another embodiment of a feedback valve useful in the present invention rather than the previously described flapper valve. As best shown in FIG. 7, valve 33 is generally H shaped and may be injection molded. The valve input link 43 as shown in FIG. 20 is positioned by the relative movement of the bimetal sensor 13 in the same manner as the earlier described input link 7 for the flapper vacuum-vent valve 101. The link 43 pivots around movable pivot point 44 which causes valve pin 45 to move sweeping a small arc.

Figure 16:
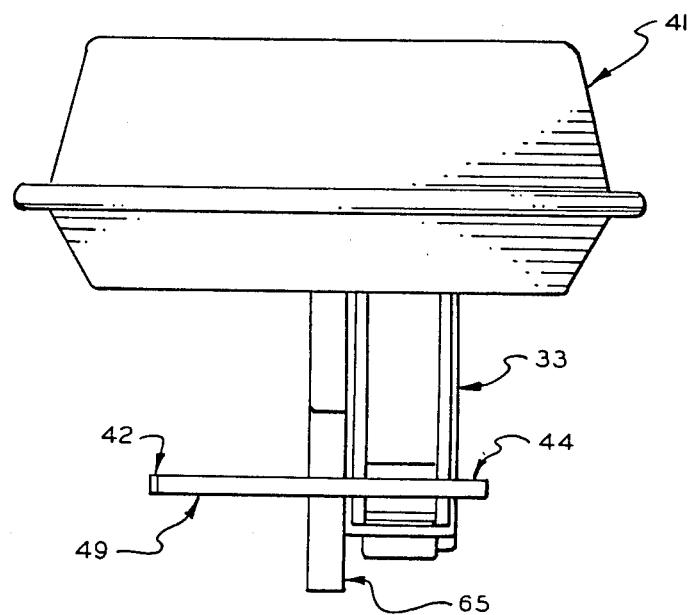
FIG. 16 is a plan view of a new rolling diaphragm vacuum-assist motor, an H vacuum-vent valve and moving pivot of the present invention.
Figure 17:
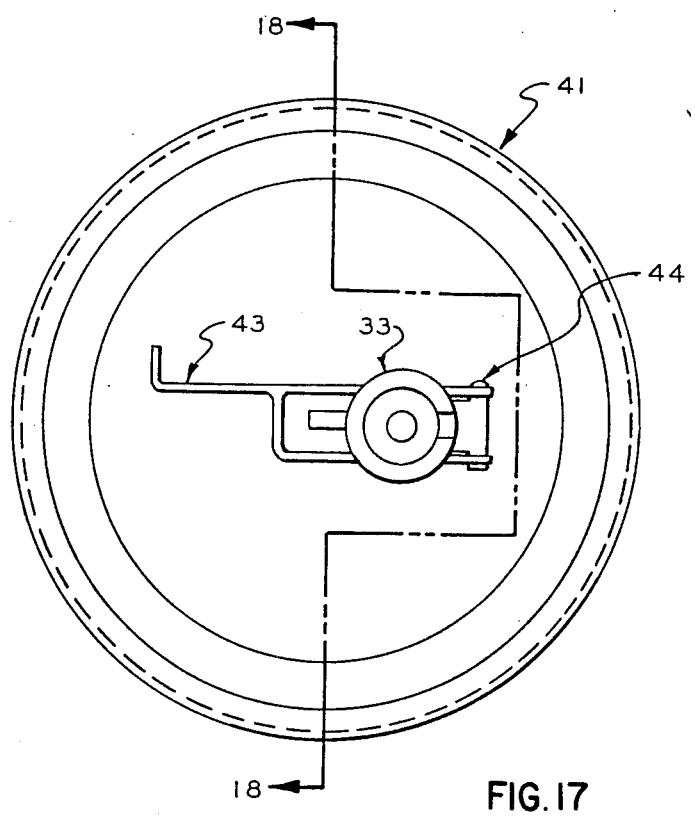
FIG. 17 is a bottom view of the rolling diaphragm vacuum-assist motor shown in FIG. 16.
Figure 18:
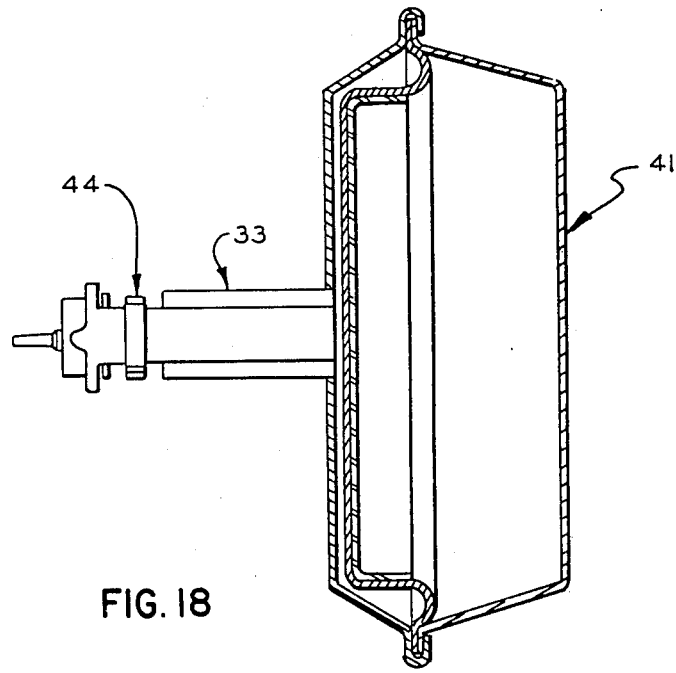
FIG. 18 is a cross-sectional view taken along line 18—18 of FIG. 17.
Figure 21:
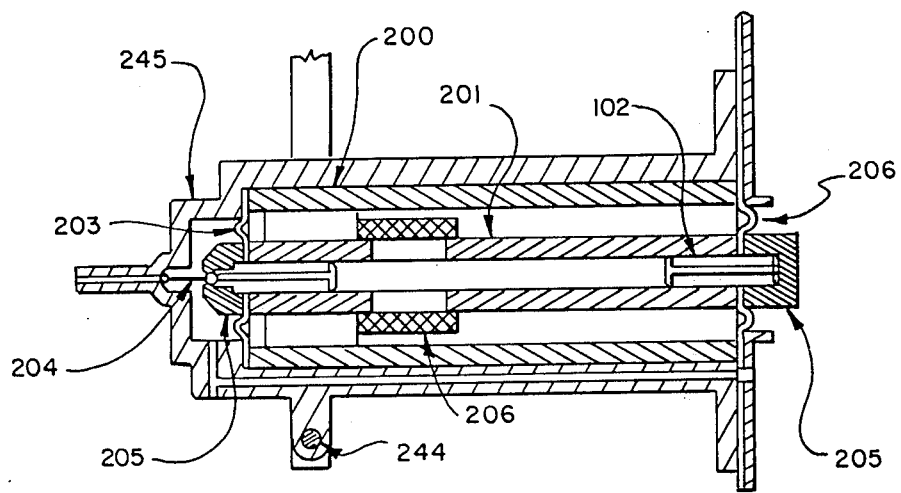

With particular reference to FIGS. 7 and 20, the valve pin 45 is firmly affixed to the valve body 46, so that movement of the valve pin 45 causes likewise movement of the valve body 46 of the H valve 33. Thus, H feedback valve 33 moves in relation to the movement supplied by the bimetal sensor 13. Referring to FIG. 7, it can be seen that as the valve body 46 moves upward, as shown, it will release itself from the annular space shown generally at 47 around the dog bone component 48. This movement will allow vacuum in space 50 of the valve and also vacuum of vacuum-assist motor 41 which is connected by orifice 56 to be vented through the annular space 47. The venting of the vacuum-assist motor causes output arm 65 to stroke. The H valve housing 57 is connected to the arm 65 so that the body will move concurrent with the motor stroking and close off the annular space 47. Likewise, if the valve body 46 moves downwardly as a result of the force applied at 45, it will bring dog bone component 48 with it, thereby removing this component from its seat shown generally as 51 and allowing additional vacuum to be supplied through inlet port 52. Output arm 65 then would stroke downward moving H valve housing 57 with it closing off inlet port 52. The output stroke 65 is calibrated such that when the stroke is in the position so that the input link 43 is horizontal as shown in FIG. 16, both the annular orifice 47 and inlet port 52 are closed off as shown in FIG. 7. Thus, the movement of input link 43 from horizontal position, as seen in FIG. 16, causes feedback valve 33 to apply vacuum or vent to motor 41, and drives the output stroke 65 as previously described moving pivot 44 until the valve input link 43 is again horizontal and annular orifice 47 and inlet port 52 (FIG. 7) are again closed off.

In prior art valves of this type, the force applied via valve body 46 was influenced by the force applied through diaphragm 53 as the vacuum in space 50 changed. In the improved design shown here, there are twin diaphragms 53, 55 attached to body 46 and connected through a balance chamber shown generally at 54. Both diaphragms then see the same vacuum level and the biasing effect of the single diaphragm is cancelled out giving an extremely accurate valve which responds to minute force variation.

Although this invention has been described with particular emphasis upon an automatic temperature control system for automobiles, many of the items are not limited to the specific structure of this system or to a temperature control system at all, but are applicable to many different applications. By the specific description herein recited, it is not intended to limit the applicability of these items or system, and it is to be understood that a coverage as wide as the applicable art will allow is being sought.

I claim:

1. A device for sensing the characteristics of its surroundings at a given point and for providing increased output which is directly proportional thereto at a second point, comprising:
   (a) sensing means having a movable output arm;
   (b) feedback means attached mechanically to the output arm of the sensing means, the mechanical attachment being a force multiplying device whereby the force applied to the feedback means from the output of the sensing means is proportionally increased; and
   (c) a vacuum motor having an output, said vacuum motor having a feedback valve attached to said feedback means so that the feedback means interacts with the motor to vary the vacuum within the motor according to the movement of the output of the sensing means and thereby causes the output of the vacuum motor to be directly proportional to the output of the sensing means.

2. The device of claim 1 wherein the feedback means is rigidly mounted on the output of the vacuum motor so that the feedback means moves as the output of the vacuum motor does.

3. A sensor feedback control valve system comprising a vacuum motor having first and second case halves entrapping therebetween a movable diaphragm,
   a vacuum port in communication with a chamber formed in the first case half, an output piston means attached to the diaphragm and movable therewith,
   a valve connected to the diaphragm, the valve having a passageway extending into the chamber, a valve member adapted to open and close the passageway,
   a sensor means having a movable arm, an elongated input link member having first and second end portions, the first end portion pivotably mounted on the output piston means, the second end portion operatively connected to the movable arm of the sensor, and the valve member is connected to the link member.

4. A sensor feedback control valve system according to claim 3 in which the connection of the valve member to the link is closer to the first end portion than to the second end portion of the link.

5. A sensor feedback control valve system according to claim 3 in which the sensor is composed of bimetal material.

6. A sensor feedback control valve system according to claim 5 in which the sensor is a bimetal coil having two ends, one end fixed and the other end connected to the movable arm.

7. A sensor feedback control valve system according to claim 3 in which the second end portion of link member is bifurcated with the sensor output arm received in the bifurcation.

8. A sensor feedback control valve system according to claim 3 in which the piston means includes a platelike member to which is attached an output member, the valve member comprising a rodlike portion which extends in generally the same direction as the output member.

9. A sensor feedback control valve according to claim 8 in which the input link extends in a direction generally transverse to that of the output member and rod-like portion.

* * * * *